(12) United States Patent
Jang et al.

(10) Patent No.: US 7,384,269 B2
(45) Date of Patent: Jun. 10, 2008

(54) CLIP FOR FLAT FLUORESCENT LAMP, FLAT FLUORESCENT LAMP HAVING THE SAME, LIQUID CRYSTAL DISPLAY DEVICE HAVING THE SAME AND METHOD OF MANUFACTURING THE SAME

(75) Inventors: Hyeon-Yong Jang, Osan-si (KR); Min-Gyu Kim, Seoul (KR)

(73) Assignee: Samsung Electronics Co., Ltd. (JP)

( * ) Notice: Subject to any disclaimer, the term of this patent is extended or adjusted under 35 U.S.C. 154(b) by 0 days.

(21) Appl. No.: 11/297,782

(22) Filed: Dec. 7, 2005

(65) Prior Publication Data

US 2006/0121779 A1 Jun. 8, 2006

(30) Foreign Application Priority Data

Dec. 7, 2004 (KR) .................. 10-2004-0102576

(51) Int. Cl.
*H01R 12/00* (2006.01)
(52) U.S. Cl. .................. 439/65; 439/857; 349/58; 349/65
(58) Field of Classification Search .......... 439/65, 439/857; 349/58, 65; 313/49–51, 234, 607, 313/594
See application file for complete search history.

(56) References Cited

U.S. PATENT DOCUMENTS

| 2005/0122048 | A1* | 6/2005 | Kang et al. ............ 313/635 |
| 2006/0018128 | A1* | 1/2006 | Park et al. ............ 362/600 |
| 2006/0170321 | A1* | 8/2006 | Lee et al. ............ 313/234 |

* cited by examiner

*Primary Examiner*—Tho D. Ta
(74) *Attorney, Agent, or Firm*—Cantor Colburn LLP

(57) ABSTRACT

A clip for a flat fluorescent lamp includes a first contact portion, a second contact portion and a connecting portion. The clip electrically connects first and second external electrodes that are on upper and lower surfaces of a lamp body of a flat fluorescent lamp. The first contact portion makes contact with the first external electrode. The first contact portion has a hole. The second contact portion makes contact with the second external electrode. The second contact portion may also have a hole. The connecting portion electrically connects the first contact portion to the second contact portion. The first external electrode is securely connected to the second external electrode, thereby improving reliability of the flat fluorescent lamp.

30 Claims, 6 Drawing Sheets

US 7,384,269 B2

CLIP FOR FLAT FLUORESCENT LAMP, FLAT FLUORESCENT LAMP HAVING THE SAME, LIQUID CRYSTAL DISPLAY DEVICE HAVING THE SAME AND METHOD OF MANUFACTURING THE SAME

The present application claims priority to Korean Patent Application No. 2004-102576, filed on Dec. 7, 2004 and all the benefits accruing therefrom under 35 U.S.C. § 119, and the contents of which in its entirety are herein incorporated by reference.

BACKGROUND OF THE INVENTION

1. Field of the Invention

The present invention relates to a clip for a flat fluorescent lamp, a flat fluorescent lamp having the clip, a liquid crystal display (LCD) device having the flat fluorescent lamp and a method of manufacturing the flat fluorescent lamp. More particularly, the present invention relates to a clip for a flat fluorescent lamp, which is capable of electrically connecting external electrodes, a flat fluorescent lamp having the clip, a liquid crystal display (LCD) device having the flat fluorescent lamp and a method of manufacturing the flat fluorescent lamp.

2. Description of the Related Art

An LCD device displays an image using liquid crystals that have optical characteristics such as anisotropy of refractivity and electrical characteristics such as anisotropy of dielectric constant. LCD devices have advantageous characteristics such as thinner thickness, lower driving voltage, lower power consumption, etc., than other display devices such as cathode ray tube (CRT) device, plasma display panel (PDP) device, etc. For at least these reasons, the LCD devices are commonly used in notebook computers, monitors, and television receivers, etc.

The LCD device is a non-emissive type display device that includes a backlight assembly to supply an LCD panel of the LCD device with a light.

A flat fluorescent lamp with a low manufacturing cost has been developed for a large screen LCD device. The flat fluorescent lamp includes a lamp body having a plurality of discharge spaces and a plurality of external electrodes through which a discharge voltage is applied to the lamp body. An inverter applies the discharge voltage to the external electrodes to form a plasma discharge in the discharge spaces. An ultraviolet light generated in the discharge spaces is converted into a visible light by a fluorescent layer formed on an inner surface of the lamp body.

When the external electrodes are on a lower surface and an upper surface of the lamp body, the external electrodes on the lower and upper surfaces are electrically connected to each other through an additional connecting member. The connecting member may not be securely combined with the external electrodes.

BRIEF SUMMARY OF THE INVENTION

The present invention provides a clip for a flat fluorescent lamp, the clip being capable of electrically connecting external electrodes.

The present invention also provides a flat fluorescent lamp having the above-mentioned clip.

The present invention also provides a liquid crystal display (LCD) device having the above-mentioned flat fluorescent lamp.

The present invention also provides a method of manufacturing the above-mentioned flat fluorescent lamp.

An exemplary embodiment of a clip for a flat fluorescent lamp includes a first contact portion, a second contact portion and a connecting portion. The clip electrically connects first and second external electrodes that are on upper and lower surfaces of a lamp body of a flat fluorescent lamp, respectively. The first contact portion including a first hole makes contact with the first external electrode. The second contact portion makes contact with the second external electrode. The connecting portion electrically connects the first contact portion to the second contact portion.

An exemplary embodiment of a flat fluorescent lamp includes a lamp, a first external electrode, a second external electrode and a clip. The lamp body generates a light. The first and second external electrodes are formed on upper and lower surfaces of the lamp body, respectively. The clip includes a first contact portion, a second contact portion and a connecting portion. The first contact portion including a first hole makes contact with the first external electrode. The second contact portion may also include a second hole making contact with the second external electrode. The connecting portion electrically connects the first and second contact portions.

An exemplary embodiment of an LCD device includes a flat fluorescent lamp, an inverter and an LCD panel. The flat fluorescent lamp includes a lamp body, a first external electrode, a second external electrode and a clip. The first and second external electrodes are formed on upper and lower surfaces of the lamp body, respectively. The clip has a first contact portion, a second contact portion and a connecting portion. The first contact portion including a first hole makes contact with the first external electrode. The second contact portion including a second hole makes contact with the second external electrode. The connecting portion electrically connects the first and second contact portions. The inverter applies a discharge voltage to the clip. The LCD panel displays an image based on a light generated from the flat fluorescent lamp.

In an exemplary embodiment of a method of manufacturing a flat fluorescent lamp is provided. First and second external electrodes are formed on upper and lower surfaces of a lamp body, respectively. The lamp body is combined with a clip. The clip has a first contact portion making contact with the first external electrode, a second contact portion making contact with the second external electrode and a connecting portion for electrically connecting the first external electrode to the second external electrode. Each of the first and second contact portions has a hole. The first and second contact portions are soldered to the first and second external electrodes, respectively.

In another exemplary embodiment, the first external electrode on the upper surface of the lamp body is securely connected to the second external electrode on the lower surface of the lamp body to improve reliability of the flat fluorescent lamp.

BRIEF DESCRIPTION OF THE DRAWINGS

The above and other advantages of the present invention will become more apparent by describing in detail exemplary embodiments thereof with reference to the accompanying drawings, in which.

DETAILED DESCRIPTION OF THE INVENTION

Figure 1:
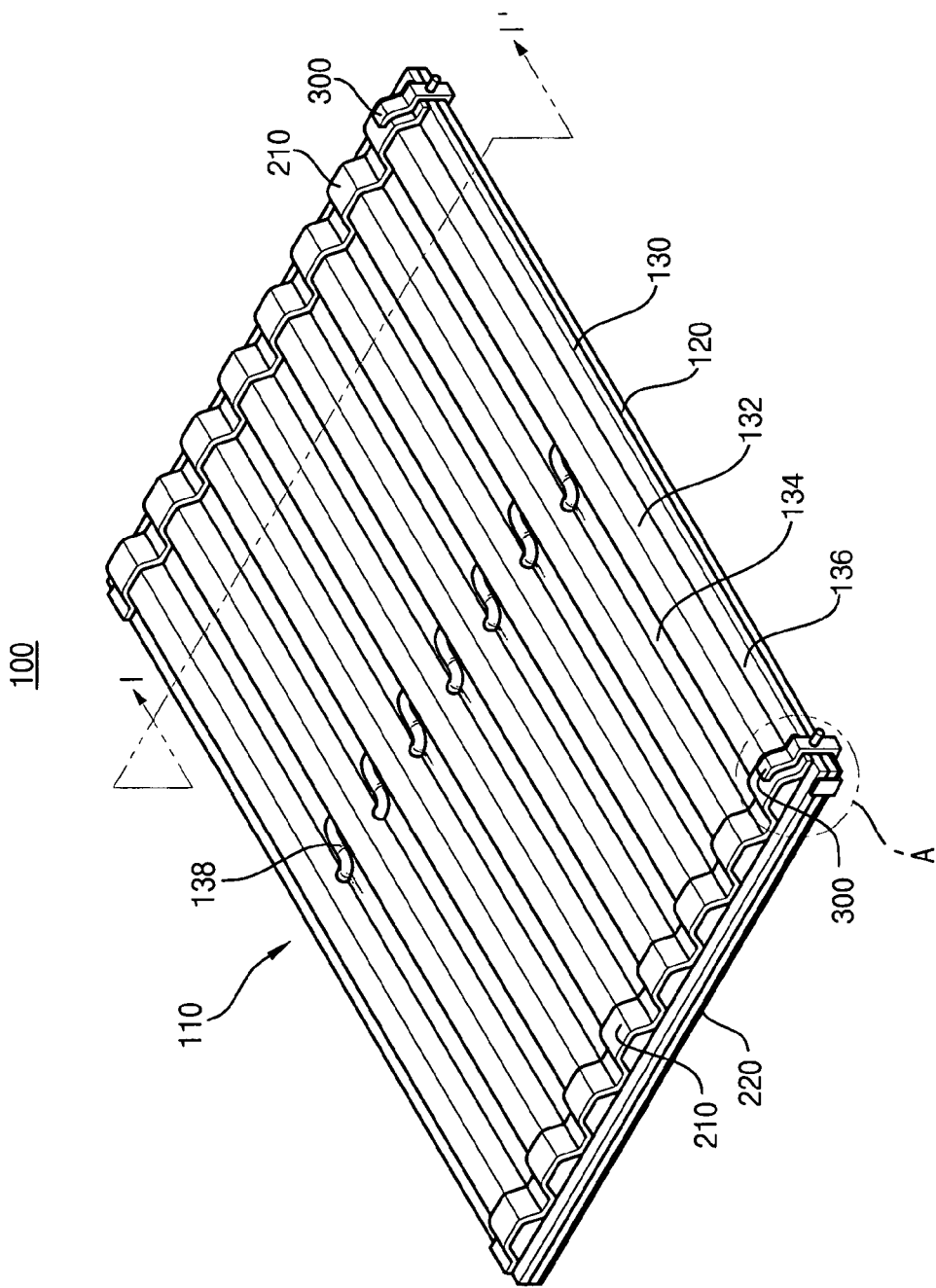
FIG. 1 is a perspective view showing an exemplary embodiment of a flat fluorescent lamp in accordance with the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on", "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

It should be understood that the exemplary embodiments of the present invention described below may be varied and modified in many different ways without departing from the inventive principles disclosed herein, and the scope of the present invention is therefore not limited to these following exemplary embodiments. Rather, these embodiments are provided so that this disclosure will be through and complete, and will fully convey the concept of the invention to those skilled in the art by way of example and not of limitation.

Hereinafter, the present invention will be described in detail with reference to the accompanying drawings.

FIG. 1 is a perspective view showing an exemplary embodiment of a flat fluorescent lamp according to the present invention.

Referring to FIG. 1, the flat fluorescent lamp 100 includes a lamp body 110, a first external electrode 210, a second external electrode 220 and a clip 300. The flat fluorescent lamp 100 may include a plurality of first external electrodes 210 and a plurality of second external electrodes 220.

The lamp body 110 includes a first substrate 120 and a second substrate 130. The second substrate 130 is combined with the first substrate 120 to form a plurality of discharge spaces. The lamp body 110 generates a light based on a discharge voltage applied to the first and second external electrodes 210 and 220.

The first external electrodes 210 are disposed on an upper surface of the second substrate 130. The first external electrodes 210 are on an outer surface of the lamp body 110. The first external electrodes 210 may be disposed on end portions of the second substrate 130 and cross the discharge spaces. In an exemplary embodiment, each of the first external electrodes 210 may be substantially perpendicular to the longitudinal direction of the discharge spaces such that each of the first external electrodes 210 is partially overlapped with the discharge spaces.

The second external electrodes 220 are disposed on a lower surface of the first substrate 120. The second external electrodes 220 are on the outer surface of the lamp body 110. The second external electrodes 220 may be disposed on end portions of the first substrate 120 and cross the discharge spaces. In an exemplary embodiment, each of the second external electrodes 220 may be substantially perpendicular to the longitudinal direction of the discharge spaces such that each of the second external electrodes 220 is partially overlapped with the discharge spaces. Each of the first and second external electrodes 210 and 220 may include a conductive material so as to receive the discharge voltage.

Referring to FIG. 1, the flat fluorescent lamp 100 further includes a clip 300 that electrically connects each of the first external electrodes 210 and each of the second external electrodes 220. In exemplary embodiments, the flat fluorescent lamp 100 may include a plurality of clips 300. In the exemplary embodiment of FIG. 1, the number of the clips 300 is equal to that of the first or second external electrodes 210 or 220. The discharge voltage is applied to the first and second external electrodes 210 and 220 through the clip 300.

Figure 2:
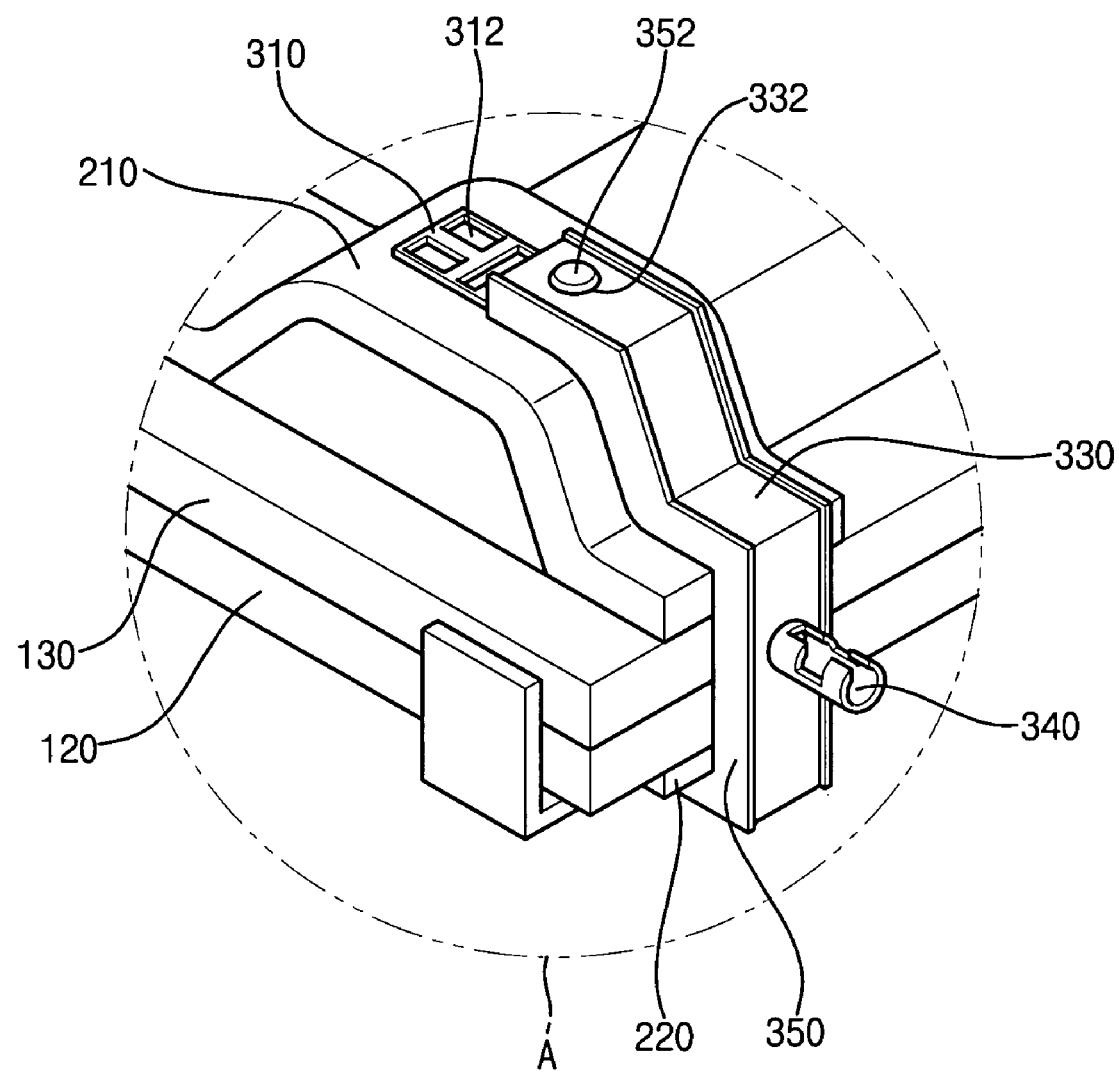
FIG. 2 is an enlarged perspective view showing a portion 'A' shown in FIG. 1.
Figure 3:
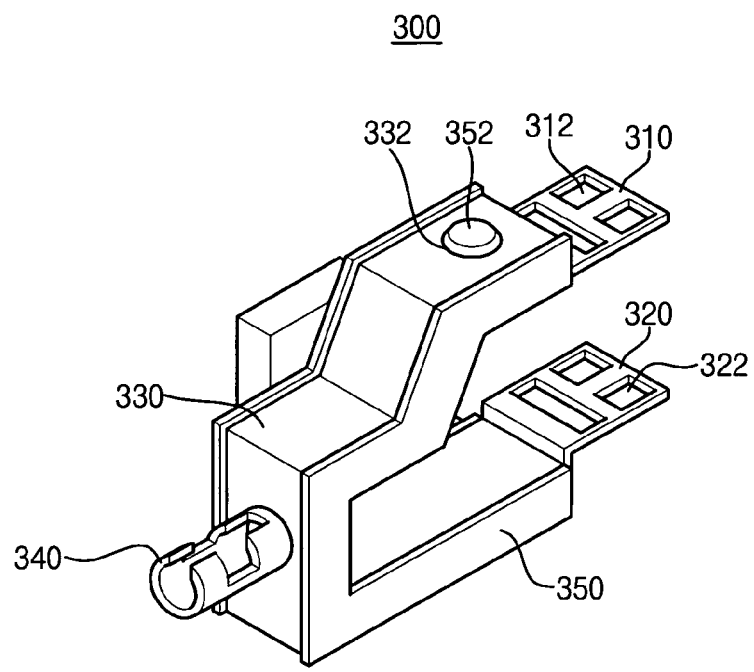
FIG. 3 is a perspective view showing an exemplary embodiment of the clip shown in FIG. 1.

FIG. 2 is an enlarged perspective view showing a portion 'A' shown in FIG. 1. FIG. 3 is a perspective view showing an exemplary embodiment of the clip shown in FIG. 1.

Referring to FIGS. 2 and 3, each of the clips 300 may be on a side surface of the lamp body 110 to electrically connect each of the first external electrodes 210 to each of the second external electrodes 220. The clips 300 may be made of any metal material suitable for the purpose described herein.

Each of the clips 300 includes a first contact portion 310, a second contact portion 320 and a connecting portion 330. The first contact portion 310 makes contact with each of the first external electrodes 210. The second contact portion 320 makes contact with each of the second external electrodes 220. The connecting portion 330 is disposed along the side surface between the first and second contact portions 310 and 320, and electrically connects the first contact portion 310 to the second contact portion 320.

In an exemplary embodiment, the first contact portion 310 has at least one first hole 312 and the second contact portion 320 has at least one second hole 322. In an alternative exemplary embodiment, only one of the first and second contact portions 310 and 320 may have the hole 312 and 302, respectively. In an exemplary embodiment, each of the first and second holes 312 and 322 may have a quadrangular shape. In alternative embodiments, there may be more than one hole 312 and 322 in the contacting portions 310 and 320. For example the number of the first holes 312 may be three. The number of the second holes 322 may also be three.

In another exemplary embodiment, the first and second contact portions 310 and 320 may be soldered to the first and second external electrodes 210 and 220, respectively. The first and second holes 312 and 322 prevent heat transfer from the soldered portion into remaining portions of each of the clips 300 so that the first and second contact portions 310 and 320 are securely combined with the first and second external electrodes 210 and 220, respectively. In an exemplary embodiment, tin may be plated on the clips 300 to prevent an oxidation of the clips 300. Advantageously, the plated tin may improve an adhesive strength between lead of the soldering and the clips 300.

Each of the clips 300 may also include a power supply line connecting portion 340 that is protruded from the connecting portion 330 so that a power supply line is electrically connected to the power supply line connecting portion 340. In an exemplary embodiment, the power supply line connecting portion 340 has a partially opened cylindrical shape. The power supply line connecting portion 340 connects to the power supply line.

Each of the clips 300 may also include a securing portion 350 that is combined with the connecting portion 330. The securing portion 350 may be disposed between the connecting portion 330 and the lamp body 110. The connecting portion 330 may have a thin plate shape and may be easily deformed. In an exemplary embodiment, the securing portion 350 fixes and supports the connecting portion 330 to prevent the deformation of the connecting portion 330. The securing portion 350 also securely combines the clips 300 to the lamp body 110. In an alternative exemplary embodiment, the securing portion 350 may be constructed of a polycarbonate. The securing portion 350 and the connecting portion 330 may have substantially the same shape as the outer surface of the lamp body 110. In an exemplary embodiment, the securing portion 350 makes contact with the lamp body 110.

In an exemplary embodiment, the securing portion 350 has a protrusion 352, and the connecting portion 330 has an opening 332. The protrusion 352 of the securing portion 350 may be inserted into the opening 332 of the connecting portion 330 to securely combine the securing portion 350 with the connecting portion 330.

The flat fluorescent lamp 100 (FIG. 1) may further include an insulating layer (not shown) on the first and second external electrodes 210 and 220 to protect the first and second external electrodes 210 and 220. The insulating layer (not shown) may have a partial opening that allows the first and second external electrodes 210 and 220 to contact the first and second contact portions 310 and 320, respectively.

Figure 4:
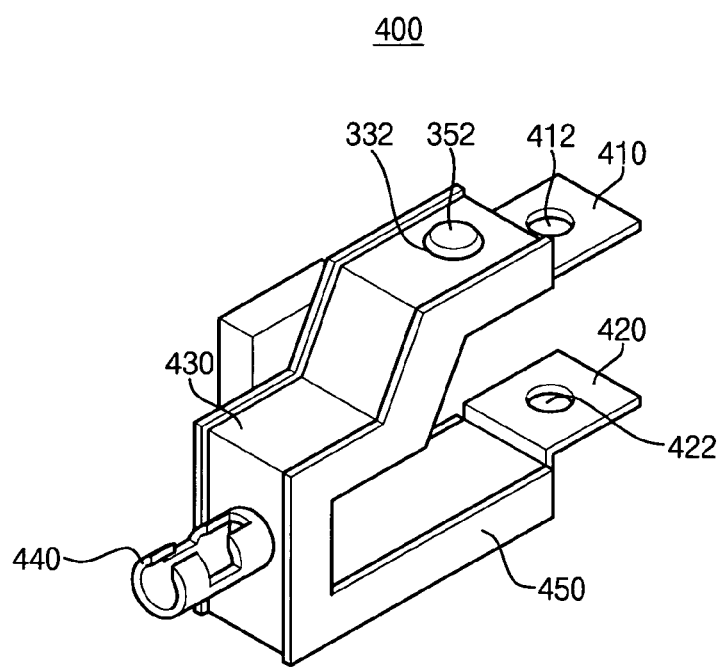
FIG. 4 is a perspective view showing another exemplary embodiment of the clip shown in FIG. 1.

FIG. 4 is a perspective view showing another exemplary embodiment of the clip shown in FIG. 1.

Referring to FIG. 4, each of the clips 400 electrically connects each of first external electrodes 210 (FIG. 1) to each of second external electrodes 220 (FIG. 1). The clips 400 may be made of any suitable metal material.

Each of the clips 400 includes a first contact portion 410, a second contact portion 420 and a connecting portion 430. The first contact portion 410 makes contact with each of the first external electrodes 210 (FIG. 1) and the second contact portion 420 makes contact with each of the second external electrodes 220 (FIG. 1). The connecting portion 430 may be disposed along a side surface between the first and second contact portions 410 and 420, and electrically connect the first contact portions 410 to the second contact portions 420. The first contact portion 410 has a first hole 412 and the second contact portion 420 has a second hole 422. In an exemplary embodiment, each of the first and second holes 412 and 422 may have a circular shape. In alternative embodiments, the first and second contact portions 410 and 420 may be soldered to the first and second external electrodes 210 and 220 (FIG. 1), respectively. The first and second holes 412 and 422 prevent heat transfer from the soldered portion to the remaining portions of each of the clips 400 so that the first and second contact portions 410 and 420 are securely combined with the first and second external electrodes 210 and 220 (FIG. 1), respectively. In another exemplary embodiment, tin may be plated on the clips 400 to prevent an oxidation of the clips 400. Advantageously, the plated tin may improve the adhesive strength between lead of the soldering and the clips 400. In another alternative embodiment, the shape and number of the first and second holes 412 and 422 may be changed to prevent the heat transfer.

Referring to FIG. 4, the clip 400 may further include a power supply line connecting portion 440 that protrudes from the connecting portion 430. The power supply line connecting portion 440 may be configured so that a power supply line (not shown) may be electrically connected to the power supply line connecting portion 440. In exemplary embodiments, the clips 400 may further include a securing portion 450 that is combined with the connecting portion 430 to fix the connecting portion 430. The power supply line fixing portion and the securing portion of FIG. 4 are essentially the same as in FIG. 3. Thus, the same reference numerals will be used to refer to the same or like parts as those described in FIG. 4 and any further explanation will be omitted.

Figure 5:
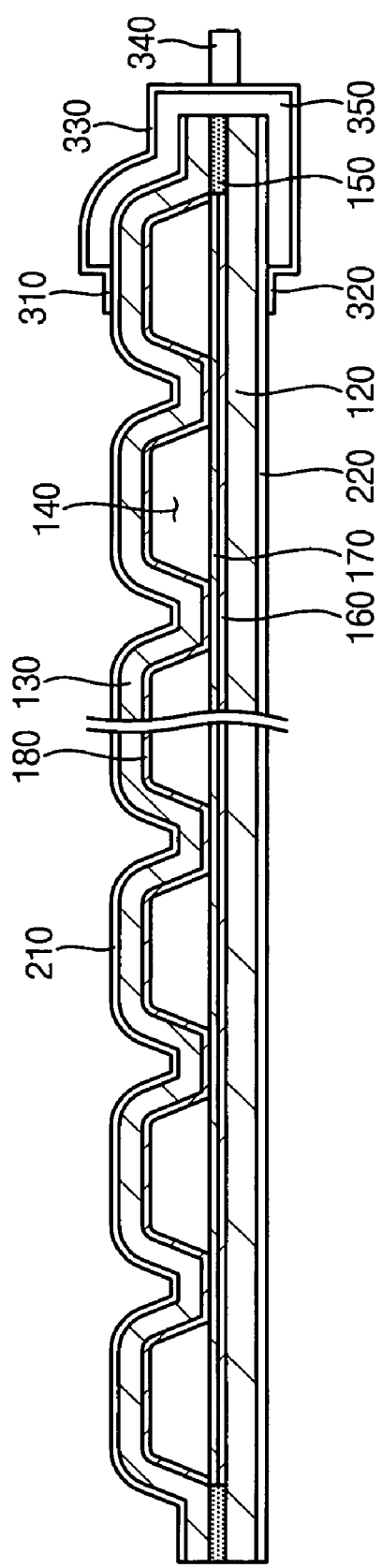
FIG. 5 is a cross-sectional view taken along line I-I' shown in FIG. 1.

FIG. 5 is a cross-sectional view taken along line I-I' shown in FIG. 1.

Referring to FIGS. 1 and 5, the flat fluorescent lamp 100 includes the lamp body 110, the first external electrodes 210, the second external electrodes 220 and the clips 300. The first external electrodes 210 are on the upper surface of the second substrate 130 and the second external electrodes 220 are on the lower surface of the first substrate 120. Each of the clips 300 electrically connects each of the first external electrodes 210 to each of the second external electrodes 220.

The lamp body 110 includes the first substrate 120 and the second substrate 130. The second substrate 130 is combined with the first substrate 120 to form the discharge spaces 140.

In exemplary embodiments, the first substrate 120 may have a quadrangular plate shape. In alternative embodiments, the first substrate 120 may be a glass substrate that has UV-proof material.

Referring to FIG. 1, the second substrate 130 has a plurality of discharge space portions 132, a plurality of space dividing portions 134 and a sealing portion 136. The discharge space portions 132 are spaced apart from the first substrate 120 to form the discharge spaces 140. The space dividing portions 134 are disposed between the discharge space portions 132, and make contact with the first substrate 120 to define sides of the discharge spaces 140. The sealing portion 136 is disposed adjacent to the sides of the second substrate 130 so that the first substrate 120 is combined with the second substrate 130. The sealing portion 136 surrounds the discharge space portions 132 and the space dividing portions 134. The second substrate 130 may be made of a transparent material so that the visible light may pass through the second substrate 130. In an exemplary embodiment, the second substrate 130 may include glass that has UV-proof material.

The second substrate 130 may be formed through a molding process. In an exemplary embodiment, a glass plate may be heated and pressed to form the second substrate 130 having the discharge space portions 132, the space dividing portions 134 and the sealing portion 136. In an alternative exemplary embodiment, the second substrate 130 may be formed through a blow molding process. In the blow molding process, the glass plate is heated and compressed by air to form the second substrate 130.

In another exemplary embodiment, a cross-section of the second substrate 130 includes a plurality of trapezoidal shapes that are connected to one another. The trapezoidal shapes may have rounded corners, and may be arranged substantially parallel. In an alternative exemplary embodiment, the cross-section of the second substrate 130 may have a semicircular shape, a quadrangular shape, a polygonal shape, as well as any shape suitable for the purpose described herein.

In exemplary embodiments, a connecting passage 138 may be formed on the second substrate 130 to connect the discharge spaces 140 adjacent to each other. In an exemplary embodiment, at least one connecting passage 138 may be formed on each of the space dividing portions 134. Each of the connecting passages 138 may be spaced apart from the first substrate 120 by a predetermined distance. The connecting passages 138 may be formed through the molding process for forming the second substrate 130. Discharge gas that is injected into one of the discharge spaces 140 may pass through each of the connecting passages 138 so that pressure in the discharge spaces 140 is substantially equal to one another. In exemplary embodiments, each of the connecting passages 138 may have various shapes such as an 'S' shape. When each of the connecting passages 138 has the 'S' shape, a path length between the adjacent discharge spaces 140 is increased so that a current formed by the discharge voltage uniformly flows through the discharge spaces 140.

In an exemplary embodiment, an adhesive 150, including, but not limited to, a frit, may be interposed between the first and second substrates 120 and 130 to combine the first substrate 120 with the second substrate 130. The frit may be a mixture of glass and metal, and may have a melting point of the frit lower than pure glass. The adhesive 150 may be prepared on the sealing portion 136 of the first and second substrates 120 and 130, and the adhesive 150 is fired and solidified.

In another exemplary embodiment, the adhesive 150 may be disposed on the sealing portion 136, and may not be formed on the space dividing portions 134. The space dividing portions 134 of the second substrate 130 may be combined with the first substrate 120 by a pressure difference between the discharge spaces 140 and outside of the flat fluorescent lamp 100. The first substrate 120 may be combined with the second substrate 130, and air between the first and second substrates 120 and 130 may be discharged so that the discharge spaces 140 are evacuated. The discharge gas is injected into the evacuated discharge spaces 140. The discharge gas may include, but is not limited to, mercury (Hg), neon (Ne) or argon (Ar). In an exemplary embodiment, the pressure of the discharge gas in the discharge spaces 140 may range from about 50 Torr to about 70 Torr. In alternative embodiments, the atmospheric pressure outside of the flat fluorescent lamp 100 may be about 760 Torr. The space dividing portions 134 are combined with the first substrate 120.

Referring to FIG. 5, the lamp body 110 may further include a reflecting layer 160, a first fluorescent layer 170 and a second fluorescent layer 180. The reflecting layer 160 may be disposed on the upper surface of the first substrate 120. The first fluorescent layer 170 may be disposed on the reflecting layer 160 and the second fluorescent layer 180 may be disposed on the lower surface of the second substrate 130. A visible light generated from the first and second fluorescent layers 170 and 180 may be reflected from the reflecting layer 160 toward the second substrate 130 to prevent a light leakage of the visible light through the first substrate 120. In another exemplary embodiment, the reflecting layer 160 may include, but is not limited to, a metal oxide such as aluminum oxide ($Al_2O_3$) or barium sulfate ($BaSO_4$) to increase a light reflectivity of the reflecting layer 160 and a color reproducibility of a display device having the flat fluorescent lamp 100.

In exemplary embodiments, when an ultraviolet light generated by the plasma discharge is irradiated onto the first and second fluorescent layers 170 and 180, excitons are generated in the first and second fluorescent layers 170 and 180. When an energy level of the excitons decreases, the first and second fluorescent layers 170 and 180 emit visible light. The reflecting layer 160 and the first and second fluorescent layers 170 and 180 may be formed through a spray coating method. In an exemplary embodiment, the reflecting layer 160 and the first fluorescent layer 170 are formed on the upper surface of the first substrate 120 and are surrounded by the sealing portion 136. The second fluorescent layer 180 is formed on the lower surface of the second substrate 130 and is surrounded by the sealing portion 136. The reflecting layer 160 and the first and second fluorescent layers 170 and 180 may not be formed on the sealing portion 136 so that the adhesive strength between the first and second substrates 120 and 130 may be increased. In an alternative exemplary embodiment, the first and second fluorescent layers 170 and 180 and the reflecting layer 160 may not be formed between the space dividing portions 134 and the first substrate 120.

The first external electrodes 210 may be disposed on the upper surface of the second substrate 130. The first external electrodes 210 are disposed on the external surface of the lamp body 110. Each of the first external electrodes 210 may be disposed on the end portions of the discharge spaces 140, and cross the discharge spaces 140. Each of the first external electrodes 210 may have a uniform width.

The second external electrodes 220 may be disposed on the lower surface of the first substrate 120. The second external electrodes 220 may also be disposed on the external surface of the lamp body 110. Each of the second external electrodes 220 may be disposed on the end portions of the discharge spaces 140, and cross the discharge spaces 140. Each of the first and second external electrodes 210 and 220 include a conductive material so that the discharge voltage is applied from the inverter (not shown) to the lamp body 110 through the first and second external electrodes 210 and 220. In an exemplary embodiment, a silver paste, including, but not limited to, a mixture of silver (Ag) and silicon oxide ($SiO_2$), may be coated on the lamp body 110 to form the first and second external electrodes 210 and 220. In an alternative exemplary embodiment, a metal powder including, but not limited to, copper (Cu), nickel (Ni), silver (Ag), gold (Au), aluminum (Al) or chromium (Cr), may be coated on the lamp body 110 to form the first and second external electrodes 210 and 220. The insulating layer (not shown) may be formed on the first and second external electrodes 210 and 220 to protect the first and second external electrodes 210 and 220.

In an exemplary embodiment, the first substrate 120 may have a flat plate shape, and the second substrate 130 ma include the discharge space portions 132, the space dividing portions 134 and the sealing portion 136. In an alternative exemplary embodiment, the second substrate 130 may have the flat plate shape, and the first substrate 120 may have the discharge space portions 132, the space dividing portions 134 and the sealing portion 136. In another exemplary embodiment, the first and second substrates 120 and 130 may have the flat plate shapes, and a plurality of partition walls (not shown) may be interposed between the first and second substrates 120 and 130 to form the discharge spaces 140.

In an exemplary method of manufacturing the flat fluorescent lamp 100, the first and second external electrodes 210 and 220 are formed on the lamp body 110. The clips 300 are combined with the lamp body 110. The clips 300 are soldered to the first and second external electrodes 210 and 220.

The lamp body 110 may include the first substrate 120 having the second external electrode 220 thereon and the second substrate 130 having the first external electrode 210. The second substrate 130 is combined with the first substrate 120 to form the discharge spaces 140. In an exemplary embodiment, the first and second external electrodes 210 and 220 are formed on the second and first substrates 130 and 120, respectively, before the combination of the first and second substrates 120 and 130. In an alternative exemplary embodiment, the first and second external electrodes 210 and 220 may be formed on the second and first substrates 130 and 120, respectively, after the combination of the first and second substrates 120 and 130.

The clips 300 may be soldered to the first and second external electrodes 210 and 220. In an exemplary embodiment, the first and second contact portions 310 and 320 are soldered to the first and second external electrodes 210 and 220, respectively, so that the first and second holes 312 and 322 are covered by the soldered lead. The clips 300 may be directly soldered to the first and second external electrodes 210 and 220 so that the first and second contact portions 310 and 320 are securely connected to the first and second external electrodes 210 and 220, respectively. In an alternative embodiment, the soldering may be performed at a high temperature.

Figure 6:
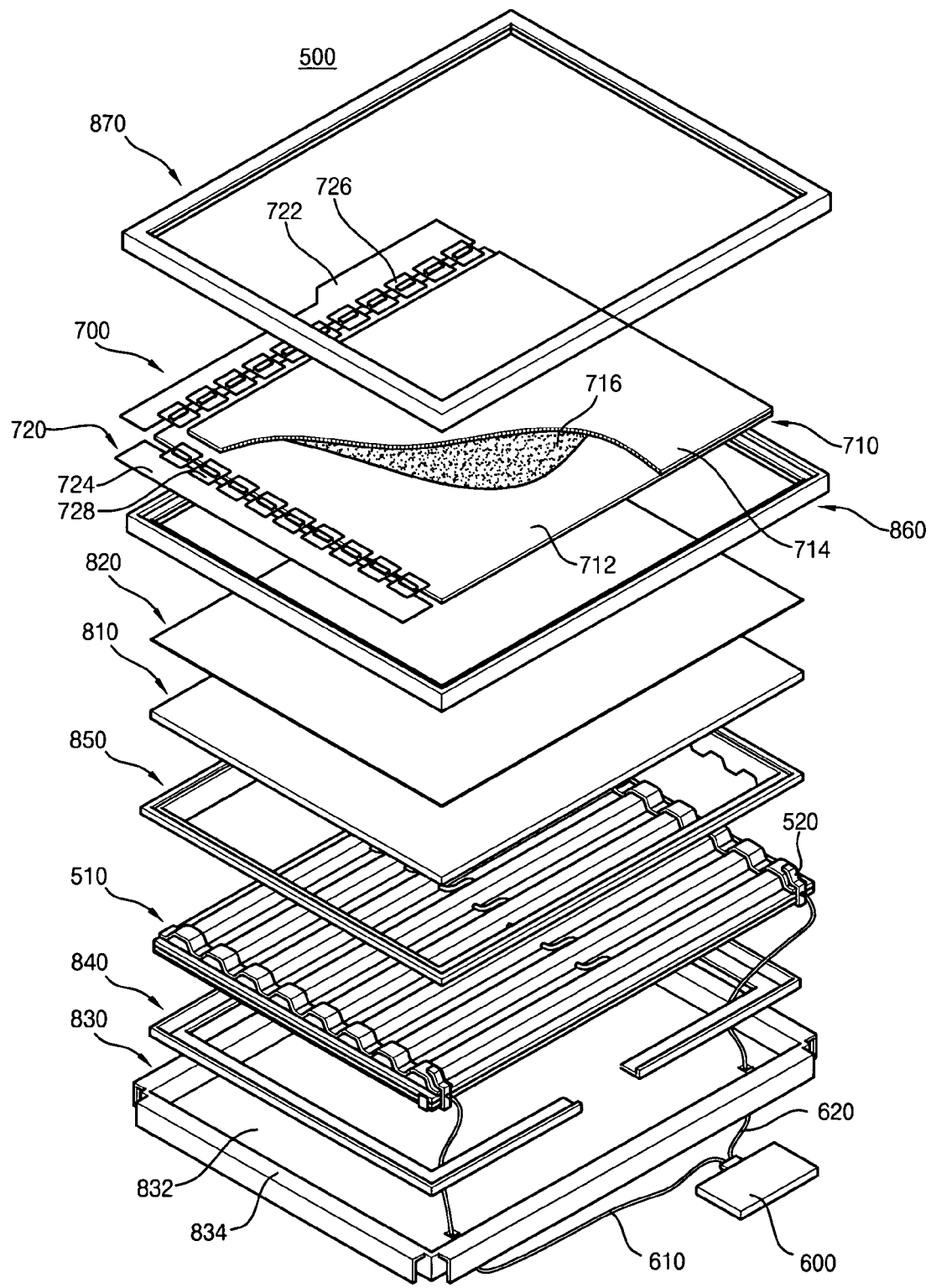
FIG. 6 is an exploded perspective view showing an exemplary embodiment of an LCD device in accordance with the present invention.
Figure 7:
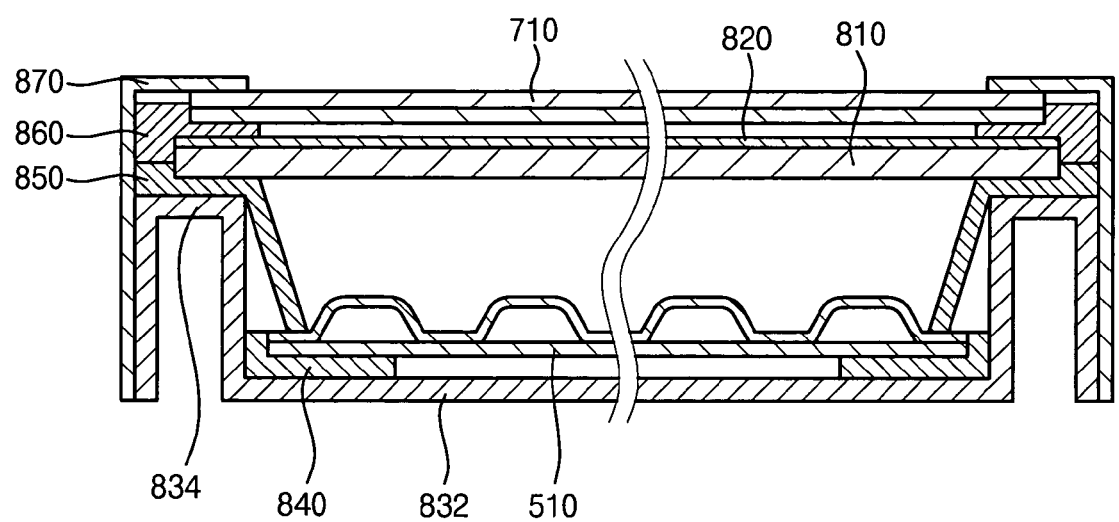
FIG. 7 is a cross-sectional view of the LCD device shown in FIG. 6.

FIG. 6 is an exploded perspective view showing an exemplary embodiment of an LCD device in accordance with the present invention. FIG. 7 is a cross-sectional view showing the LCD device shown in FIG. 6.

Referring to FIGS. 6 and 7, the LCD device 500 includes a flat fluorescent lamp 510, an inverter 600 and a display unit 700. The flat fluorescent lamp 510 generates a light. The inverter 600 generates a discharge voltage to drive the flat fluorescent lamp 510. The display unit 700 displays images based on the light generated from the flat fluorescent lamp 510.

In an exemplary embodiment, the flat fluorescent lamp 510 includes a plurality of clips 520 for electrically connecting first external electrodes on an upper surface of a lamp body to second external electrodes on a lower surface of the lamp body. Each of the clips 520 may include a first contact portion that makes contact with each of the first external electrodes, a second contact portion that makes contact with each of the second external electrodes and at least one hole formed on each of the first and second contact portions. The flat fluorescent lamp 510 of FIGS. 6 and 7 is similar to the one depicted in FIGS. 1 to 5. Thus, the same reference numerals will be used to refer to the same or like parts as those described in FIGS. 1 to 5 and any further explanation will be omitted.

In an exemplary embodiment, the inverter 600 generates a discharge voltage to drive the flat fluorescent lamp 510. The inverter 600 elevates a level of a voltage that is provided from a source outside of the inverter 600 to drive the flat fluorescent lamp 510. The inverter 600 may be on a rear surface of a receiving container 830. The inverter 600 is electrically connected to the flat fluorescent lamp 510 through a first power supply line 610 and a second power supply line 620. End portions of the first and second power supply lines 610 and 620 are electrically connected to power supply line connecting portions of the clips 520, respectively. The discharge voltage generated from the inverter 600 is applied to the first and second external electrodes 600 through the first and second power supply lines 610 and 620.

The display unit 700 may include an LCD panel 710 and a driving circuit member 720. The LCD panel 710 displays the images using the light generated from the flat fluorescent lamp 510. The driving circuit member 720 applies driving signals to the LCD panel 710.

The LCD panel 710 includes a thin film transistor (TFT) substrate 712, a color filter substrate 714 and a liquid crystal layer 716. The color filter substrate 714 may be disposed on the TFT substrate 712. The liquid crystal layer 716 is interposed between the TFT substrate 712 and the color filter substrate 714.

In an exemplary embodiment, the TFT substrate 712 has a plurality of TFTs (not shown) that may be arranged in a matrix shape. The TFT substrate 712 may be a glass substrate. A source electrode of each of the TFTs may be electrically connected to a data line. A gate electrode of each of the TFTs may be electrically connected to a gate line. A drain electrode of each of the TFTs may be electrically connected to a pixel electrode that has transparent conductive material.

The color filter substrate 714 may have red (R), green (G) and blue (B) color filters that have a thin film shape. The color filter substrate 714 may have a common electrode (not shown) that comprises a transparent conductive material.

When a voltage is applied to the gate electrode of each of the TFTs so that the TFT is turned on, an electric field is formed between a pixel electrode (not shown) and the common electrode (not shown). The arrangement of the liquid crystal layer 716 between the TFT substrate 712 and the color filter 714 is changed by the electric field applied to the liquid crystal layer 716 so that a light transmittance of the liquid crystal layer 716 is changed to display images having a predetermined gray-scale.

In exemplary embodiments, the driving circuit member 720 may include a data printed circuit board (PCB) 722, a gate PCB 724, a data flexible circuit film 726 and a gate flexible film 728. The data PCB 722 applies a data driving signal to the LCD panel 710. The gate PCB 724 applies a gate driving signal to the LCD panel 710. The data flexible circuit film 726 electrically connects the data PCB 722 to the LCD panel 710. The gate flexible circuit film 728 electrically connects the gate PCB 724 to the LCD panel 710. In alternative embodiments, each of the data and gate flexible circuit films 726 and 728 may be a tape carrier package (TCP) or a chip on film (COF).

In an exemplary embodiment, the data flexible circuit film 726 is backwardly bent so that the data PCB 722 is disposed on a side surface or the rear surface of the receiving container 830. The gate flexible circuit film 728 is backwardly bent so that the gate PCB 724 is disposed on the side surface or the rear surface of the receiving container 830. In an alternative exemplary embodiment, an auxiliary signal line (not shown) is formed on the LCD panel 710 and the gate flexible circuit film 728 so that the gate PCB 724 may be omitted.

The LCD device 500 may further include a light diffusion plate 810 and an optical sheet 820. The light diffusion plate 810 may be disposed on the flat fluorescent lamp 510 to diffuse the light generated from the flat fluorescent lamp 510. The optical sheet 820 may be disposed on the diffusion plate 810.

The diffusion plate 810 diffuses the light generated from the flat fluorescent lamp 510 to uniformize the luminance of the light. The diffusion plate 810 may include a plate shape having a predetermined thickness. The diffusion plate 810 may be spaced apart from the flat fluorescent lamp 510 by a predetermined distance. The diffusion plate 810 may have a transparent material and a diffusing agent. In an exemplary embodiment, the diffusing agent includes polymethyl methacrylate (PMMA).

In an exemplary embodiment, an optical sheet 820 guides the light that has passed through the diffusion plate 810. The optical sheet 820 may include a bright enhancement film (BEF) that improves luminance when viewed from a front of the LCD panel 710. In an alternative exemplary embodiment, the optical sheet 820 may further include a diffusion sheet for diffusing the diffused light that has passed through the diffusion plate 810. It is also contemplated that the LCD device 500 may further include various optical sheets.

In exemplary embodiments, the LCD device 500 may further include the receiving container 830 that receives the flat fluorescent lamp 510. The receiving container 830 includes a bottom plate 832 and a plurality of sidewalls 834 that protrude from sides of the bottom plate 832. The sidewalls 834 may be bent to form a U shape so that the receiving container 830 is securely combined with other elements such as a mold frame (not shown) or a top chassis 870. In another exemplary embodiment, the receiving container 830 may be constructed of a strong metal that is resistant to deformation.

In an exemplary embodiment, the LCD device 500 may further include an insulating member 840 that is interposed between the flat fluorescent lamp 510 and the receiving container 830 to support the flat fluorescent lamp 510. The insulating member 840 may be disposed adjacent to sides of the flat fluorescent lamp 510 so that the flat fluorescent lamp 510 is spaced apart from the receiving container 830. The insulating member 840 may be construed of any suitable insulating material. In an exemplary embodiment, the insulating member 840 may include an elastic material to absorb an impact that is provided from an outside of the LCD device 500. Examples of the elastic material for the insulating member 840 may include, but are not limited to, rubber, silicone resin, as well as any combination including at least one of the foregoing. In another exemplary embodiment, the insulating member 840 may include two U-shaped pieces, four L-shaped pieces corresponding to corners of the flat fluorescent lamp 510 or four linear pieces corresponding to the sides of the flat fluorescent lamp 510. In an alternative exemplary embodiment, the insulating member 840 may have a single frame shape.

In an exemplary embodiment, the LCD device 500 may further include a first mold 850 interposed between the flat fluorescent lamp 510 and the diffusion plate 810. The first mold 850 fixes the flat fluorescent lamp 510, and supports the diffusion plate 810. The first mold 850 may be combined with the sidewalls 834 of the receiving container 830, and fix the flat fluorescent lamp 510. The first mold 850 makes contact with the upper surface of the flat fluorescent lamp 510 adjacent to the sidewalls 834. In an exemplary embodiment, the first mold 850 has a frame shape. In an alternative exemplary embodiment, the first mold 850 may have two U-shaped pieces or two L-shaped pieces.

In an exemplary embodiment, the LCD device 500 may further include a second mold 860 interposed between the optical sheet 820 and the LCD panel 710. The second mold 860 fixes the optical sheet 820 and the diffusion plate 810, and supports the LCD panel 710. In an exemplary embodiment, the second mold 860 has a frame shape. In an alternative exemplary embodiment, the second mold 860 may have two U-shaped pieces or two L-shaped pieces.

In an exemplary embodiment, the LCD device 500 may further include a top chassis 870 to fix the display panel 710. The top chassis 870 is combined with the receiving container 830 to fix the sides of the LCD panel 710 to the second mold 860. The top chassis 870 protects the LCD panel 710 from the externally provided impact, and prevents a drifting of the LCD panel 710 on the second mold 860.

According to exemplary embodiments of the present invention, a hole is formed on the contact portion of the clip that is soldered to the external electrode to prevent the heat transfer from the soldered portion into remaining portions of the clip. Advantageously, the clip is securely combined with the external electrode, thereby improving reliability of the soldering. In addition, tin is plated on the clip to prevent the oxidation of the clip. The plated tin also improves the adhesive strength between the soldered lead and the clip.

This invention has been described with reference to the exemplary embodiments. It is evident, however, that many alternative modifications and variations will be apparent to those having skill in the art in light of the foregoing description. Accordingly, the present invention embraces all such alternative modifications and variations as fall within the spirit and scope of the appended claims.

What is claimed is:

1. A clip for electrically connecting a first and second external electrode disposed on upper and lower surfaces of a lamp body of a flat fluorescent lamp, the clip comprising:
   a first contact portion that makes contact with the first external electrode, the first contact portion comprising a first hole;
   a second contact portion that makes contact with the second external electrode; and
   a connecting portion that electrically connects the first contact portion to the second contact portion.

2. The clip of claim 1, wherein the second contact portion comprises a second hole.

3. The clip of claim 1, wherein the connecting portion is along a side surface of the lamp body.

4. The clip claim 3, further comprising a power supply line connecting portion protruded from the connecting.

5. The clip of claim 3, further comprising a securing portion combined with the connecting portion to fix the connecting portion.

6. The clip of claim 5, wherein the securing portion comprises a protrusion for combining the securing portion with the connecting portion.

7. The clip of claim 6, wherein the connecting portion comprises an opening for receiving the protrusion of the securing portion.

8. The clip of claim 1, wherein the clip is plated with tin.

9. A flat fluorescent lamp comprising:
   a lamp body;
   a first and a second external electrode formed on upper and lower surfaces of the lamp body; and
   a clip including:
      a first contact portion that makes contact with the first external electrode, the first contact portion comprising a first hole;
      a second contact portion that makes contact with the second external electrode; and
      a connecting portion that electrically connects the first and second contact portions.

10. The flat fluorescent lamp of claim 9, wherein the second contact portion comprises a second hole.

11. The flat fluorescent lamp of claim 9, wherein the clip further comprises a power supply line connecting portion that protrudes from the connecting portion.

12. The flat fluorescent lamp of claim 9, wherein the clip further comprises a securing portion interposed between the connecting portion and the lamp body to fix the connecting portion.

13. The flat fluorescent lamp of claim 12, wherein the securing portion further comprises a protrusion for combining the securing portion with the connecting portion.

14. The flat fluorescent lamp of claim 13, wherein the connecting portion comprises an opening for receiving the protrusion of the securing portion.

15. The flat fluorescent lamp of claim 9, wherein the first and second contact portions are soldered on the first and second external electrodes.

16. The flat fluorescent lamp of claim 15, wherein the clip is plated with tin.

17. The flat fluorescent lamp of claim 9, wherein the lamp body comprises:
   a first substrate; and
   a second substrate combined with the first substrate, the second substrate including:
      a plurality of discharge space portions being spaced apart from the first substrate to form a plurality of discharge spaces;
      a plurality of space dividing portions between the discharge space portions, the space dividing portions making contact with the first substrate; and
      a sealing portion surrounding the discharge space portions and the space dividing portions, the sealing portion making contact with the first substrate.

18. The flat fluorescent lamp of claim 17, wherein the first and second external electrode are extended substantially perpendicular to a longitudinal direction of the discharge spaces to be partially overlapped with the discharge spaces.

19. A liquid crystal display device comprising:
   a flat fluorescent lamp including:
      a lamp body;
      a first external electrode and a second external electrode formed on upper and lower surfaces of the lamp body; and
      a clip comprising:
         a first contact portion that makes contact with the first external electrode, the first contact portion having a first hole;
         a second contact portion that makes contact with the second external electrode; and
         a connecting portion that electrically connects the first and second contact portions;
   an inverter that applies a discharge voltage to the clip; and
   a liquid crystal display panel that displays an image based on a light generated from the flat fluorescent lamp.

20. The liquid crystal display device of claim 19, wherein the second contact portion includes a second hole.

21. The liquid crystal display device of claim 19, wherein the clip further comprises a power supply line connecting portion protruded from the connecting portion for electrically connecting the clip to a power supply line.

22. The liquid crystal display device of claim 19, wherein the clip further comprises a securing portion interposed between the connecting portion and the lamp body to fix the connecting portion.

23. The liquid crystal display device of claim 22, wherein the securing portion comprises a protrusion and the connecting portion further comprises an opening, wherein the protrusion of the securing portion is inserted into the opening of the connecting portion to combine the securing portion with the connecting portion.

24. The liquid crystal display device of claim 19, wherein the first and second contact portions are soldered onto the first and second external electrodes.

25. The liquid crystal display device of claim 19, further comprising:
   a diffusion plate disposed on the flat fluorescent lamp to diffuse the light generated from the flat fluorescent lamp; and
   an optical sheet disposed on the diffusion plate.

26. The liquid crystal display device of claim 25, further comprising:
   a receiving container that receives the flat fluorescent lamp;
   an insulating member interposed between the flat fluorescent lamp and the receiving container;
   a first mold that fixes the flat fluorescent lamp and supports the diffusion plate; and
   a second mold that fixes the diffusion plate and the optical sheet and supports the liquid crystal display panel.

27. A method of manufacturing a flat fluorescent lamp, comprising:
   forming a first and a second external electrode on upper and lower surfaces of a lamp body;

combining the lamp body with a clip that has a first contact portion making contact with the first external electrode, a second contact portion making contact with the second external electrode and a connecting portion for electrically connecting the first external electrode to the second external electrode, the first and second contact portions having a first hole and a second hole; and soldering the first and second contact portions to the first and second external electrodes, respectively.

28. The method of claim 27, wherein the first and second contact portions are soldered so that the first and second holes are covered by soldered lead.

29. The method of claim 27, wherein the clip further comprises a securing portion interposed between the connecting portion and the lamp body to fix the connecting portion.

30. The method of claim 27, wherein the lamp body comprises:
- a first substrate having the second external electrode disposed thereon; and
- a second substrate having the first external electrode disposed thereon, the second substrate being combined with the first substrate to form a plurality of discharge spaces.

* * * * *